(12) United States Patent
Mittricker et al.

(10) Patent No.: US 6,684,644 B2
(45) Date of Patent: Feb. 3, 2004

(54) METHOD FOR UTILIZING GAS RESERVES WITH LOW METHANE CONCENTRATIONS AND HIGH INERT GAS CONCENTRATIONS FOR FUELING GAS TURBINES

(75) Inventors: Frank F. Mittricker, Houston, TX (US); Donald J. Victory, Sugarland, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 10/326,736

(22) Filed: Dec. 20, 2002

(65) Prior Publication Data

US 2003/0084668 A1 May 8, 2003

Related U.S. Application Data

(62) Division of application No. 09/917,451, filed on Jul. 27, 2001, which is a division of application No. 09/460,149, filed on Dec. 13, 1999, now Pat. No. 6,298,652.

(51) Int. Cl.[7] ................................................ F02C 3/22
(52) U.S. Cl. ...................................... 60/772; 60/39.465
(58) Field of Search .......................... 60/772, 39.465; 62/619; 75/47

(56) References Cited

U.S. PATENT DOCUMENTS

| 3,418,082 A | 12/1968 | Ter Haar ..................... 23/213 |
| 3,653,183 A | 4/1972 | Sanders et al. ................ 55/56 |
| 3,739,581 A | 6/1973 | Talmor ....................... 60/206 |
| 3,868,817 A | 3/1975 | Marion et al. ............... 60/39.02 |
| 4,132,065 A | 1/1979 | McGann .................... 60/39.02 |
| 4,299,086 A | 11/1981 | Madgavkar et al. ....... 60/39.06 |
| 4,305,733 A | 12/1981 | Scholz et al. ................. 48/196 |
| 4,311,496 A | 1/1982 | Fabian ......................... 62/17 |
| 4,363,361 A | 12/1982 | Madgavkar et al. ........ 166/256 |
| 4,366,668 A | 1/1983 | Madgavkar et al. ....... 60/39.06 |
| 4,383,837 A | 5/1983 | Smith ......................... 48/197 |
| 4,421,535 A | 12/1983 | Mehra ......................... 62/17 |
| 4,423,155 A | 12/1983 | Bell et al. ..................... 502/38 |
| 4,483,138 A * | 11/1984 | Willis ..................... 60/39.465 |
| 4,483,943 A | 11/1984 | Windawi et al. ............ 502/342 |
| 4,496,371 A | 1/1985 | Urban et al. ................. 48/197 |
| 4,595,396 A | 6/1986 | Erdman ........................ 44/63 |
| 4,623,371 A | 11/1986 | Mehra ......................... 62/17 |
| 4,631,915 A | 12/1986 | Frewer et al. .............. 60/39.12 |
| 4,697,413 A * | 10/1987 | Pohl ........................... 60/780 |
| 4,733,528 A | 3/1988 | Pinto ......................... 60/39.12 |
| 4,861,745 A | 8/1989 | Huang et al. ................ 502/314 |
| 5,048,284 A | 9/1991 | Lywood et al. ............ 60/39.02 |
| 5,435,836 A | 7/1995 | Anand et al. .................. 95/45 |
| 5,516,967 A | 5/1996 | Pandey et al. ............. 48/198.1 |
| 5,666,823 A * | 9/1997 | Smith et al. .................. 62/646 |
| 5,705,916 A | 1/1998 | Rudbeck et al. ............ 322/2 R |
| 5,715,671 A * | 2/1998 | Griffiths ....................... 60/783 |
| 5,725,616 A | 3/1998 | Lynum et al. ............. 48/127.3 |
| 5,740,673 A * | 4/1998 | Smith et al. ................... 60/783 |
| 5,741,440 A | 4/1998 | Cooper et al. .............. 252/373 |
| 5,861,441 A | 1/1999 | Waycuilis .................... 518/703 |
| 6,293,979 B1 | 9/2001 | Choudhary et al. ........ 48/198.7 |
| 6,301,927 B1 * | 10/2001 | Reddy ......................... 62/619 |
| 6,460,341 B1 * | 10/2002 | Gutmark et al. .............. 60/772 |

FOREIGN PATENT DOCUMENTS

| EP | 0351094 | 3/1994 | ............ F02C/3/20 |
| EP | 0723068 | 7/1999 | ............ F01K/23/10 |
| GB | 2085314 | 4/1982 | ............ B01J/23/78 |
| WO | WO 93/13307 | 7/1993 | ............ F02G/3/00 |

OTHER PUBLICATIONS

Frank J. Brooks, "GE Gas Turbine Performance Characteristics", GER–3567H, GE Power Systems, Schenctady, NY, 10/00. Downloaded from the internet Sept. 4, 2003.*

* cited by examiner

Primary Examiner—Ehud Gartenberg
(74) Attorney, Agent, or Firm—Linda Kubena

(57) ABSTRACT

The invention is directed to a method of fueling gas turbines from natural gas reserves with relatively low methane concentrations. The invention uses such reserves to generate electric power. The invention permits the use of these reserves at significantly lower cost than by producing pipeline natural gas to fuel gas turbines to generate electric power. These reserves currently generally are used only after the removal of impurities to produce pipeline natural gas quality turbine fuel. The latter current technology is capital intensive, and at current natural gas prices, economically unattractive. The process of the invention can remove the impurities from the gas from the natural gas reserve necessary for protection of the environment, and leaves inert gasses in the fuel in an amount which will increase the output of a gas turbine for the generation of power by about 5 to about 20%.

6 Claims, 4 Drawing Sheets

METHOD FOR UTILIZING GAS RESERVES WITH LOW METHANE CONCENTRATIONS AND HIGH INERT GAS CONCENTRATIONS FOR FUELING GAS TURBINES

This application is a Divisional of U.S. application Ser. No. 09/917,451, filed Jul. 27, 2001, now allowed, which is a Divisional of U.S. application Ser. No. 09/460,149, filed Dec. 13, 1999, now U.S. Pat. No. 6,298,652.

This invention relates to the combustion of natural gas having relatively low methane concentrations and relatively high concentrations of inert gases. More particularly, this invention relates to the utilization of natural gas reserves having methane gas concentrations of from above 40 to about 80 volume percent methane by increasing the relative concentration of inert gases and using the methane produced thereby in a process which produces pipeline natural gas. In one aspect, blending hydrogen gas to provide an inert gas and hydrogen enhanced methane gas blend with a methane gas concentration of not more than about 40 volume percent, based upon the total volume of the gas. This gas blend is used for fuel in gas turbines.

BACKGROUND OF THE INVENTION

Currently there are substantial methane gas reserves with relatively low methane gas concentrations. Many of these reserves have methane gas concentrations from about 40 to about 80 volume percent. Currently, impurities are removed from natural gas to make pipeline quality natural gas which normally have methane concentrations of from about 95+ to about 99+ volume percent. To fuel gas turbines to make electric power, converting natural gas having methane concentrations of from about 40 to about 80 volume percent methane to pipeline quality natural gas becomes economically impractical because the conversion is capital intensive. Moreover, natural gas with methane concentrations in the range of 40 to 80 volume percent does not necessarily provide a reliable fuel source for gas turbines, especially at the low end of the latter range, to generate power with enhanced outputs of power because natural gas with such low methane concentrations will not provide a stable flame for fuel combustion without special equipment designs, catalysts and without special balancing of oxygen with other combustibles. Moreover, streams with 40 to 80 volume percent methane have the problem of NOx as a result of higher flame temperatures in the turbine.

It would be economically advantageous to utilize natural gas reserves with 40 to 80 volume percent methane and with large amounts of inert gases and purify such streams or a portion of such streams to provide a fuel for gas turbines at significantly lower cost than by producing pipeline quality natural gas for fuel for gas turbines.

SUMMARY OF THE INVENTION

The invention is directed to a method of fueling gas turbines from natural gas reserves with relatively low methane concentrations of from about 40 to about 80 volume percent and relatively high inert gas concentrations. The invention permits the use of these reserves at significantly lower cost than by producing pipeline natural gas to fuel gas turbines to generate electric power. As described, these reserves currently generally are used only after the removal of impurities to produce pipeline natural gas quality turbine fuel. Also as previously described, the latter current technology is capital intensive, and at current natural gas prices, economically unattractive. The process of the invention can remove the impurities from the gas from the natural gas reserve necessary for protection of the environment, and leaves inert gases in the fuel in an amount which will increase the output of a gas turbine for the generation of power by about 5 to about 20%. In one aspect the process of the invention contemplates leaving the inert gases in the fuel to maximize mass flow through the gas turbine and to increase power output without the expense of producing pipeline quality methane gas and blending additional inert gases into the fuel to additionally enhance the mass flow through the turbine and lower flame temperature to reduce Nox.

In one aspect the process of the invention uses a natural gas stream and process which is being used to produce pipeline quality natural gas. In this aspect during the purification process inert gases are separated from methane gas in the natural gas reserves with from about 40 to about 80 volume percent methane. A separation may be made which removes only such an amount of methane to provide an inert enhanced methane gas blend which is effective for providing an increase in output of power by a gas turbine of by about 5 to about 20% as compared to a turbine fueled with pipeline quality natural gas. The purified methane stream generated by this separation then may be sent for further purification to produce pipeline quality natural gas. Alternatively there may be a general separation of inert gases from the methane gas and the inert gases separated from the methane then are mixed with the natural gas stream which has not had the inert gases removed (or another gas stream with 40 to 80 volume percent methane) in an amount which will increase the output of the gas turbine by about 5 to about 20% as compared to a turbine fueled with pipeline quality natural gas.

In one aspect where nitrogen gas is the primary inert gas, membranes are used to do the primary separation of the inert nitrogen gas from the natural gas and methane therein. Membranes commercially available and sold under the name of Medal from Air Liquide, Houston Tex., are suitable for such separation. This separation may be done only in an amount to increase the output of a turbine as previously described, or the nitrogen separated from the natural gas then is combined with the natural gas reserve to provide and inert enhanced natural gas which will increase the output of the turbine by about 5 to about 20% as compared to a turbine fueled with pipeline quality natural gas.

Membranes may be used to separate carbon dioxide and methane when the carbon dioxide concentration is up to about 45 volume percent. In another aspect where carbon dioxide is the primary inert gas at concentrations above about 45 volume percent, the carbon dioxide is separated from the natural gas reserve containing from about 40 to about 80 volume percent methane cryogenically. In one aspect when the pressure of the natural gas is high, such as greater then about 2500 psig, the high pressure feed gas is flashed to a lower pressure, such as about 500 psig. A Joule Thomson effect on this expansion is in an amount effective to provide a cooling to do a cryogenic separation. When the pressure of the natural gas reserve is low, such as below about 1100 psig the separation may be achieved an external refrigeration of the natural gas reserve to provide the cooling effective for separating the carbon dioxide from the natural gas reserve and the methane there.

In a very important aspect, inert gases are separated from the natural gas reserve and the methane therein to provide a methane gas with less than about 40 volume percent methane. The methane separated from the natural gas reserve then may be sent for further processing to make pipeline equality natural gas. The inert gases separated from the natural gas stream then are mixed back into the natural gas stream from the well in an amount effective for providing a methane/inert gas blend having less than about 40 volume percent methane to provide an inert enhanced methane gas blend. The inert enhanced methane gas blend is blended with hydrogen, or in an important aspect, just enough methane is shifted to hydrogen gas to produce a gas fuel blend of hydrogen/inert gas/methane gas that not only is an acceptable fuel for gas turbines, but the blend is effective for providing flame stability (such as providing the gas with at least 110 BTUs per standard cubic foot of gas) and for producing more power than a standard natural gas having from about 95+ to about 99+ volume percent methane. If required, the hydrogen/inert gas/methane gas blend is dehydrated to remove a sufficient amount of water to provide a flame stable dehydrated hydrogen/inert gas/methane gas blend. In an important aspect, this blend has at least about 6 volume percent hydrogen. The flame stable hydrogen enhanced hydrogen/inert gas/methane gas blend then is used to fuel an electric power producing gas turbine. In this aspect, the method of the invention is effective for increasing the power output of a gas turbine by at least about 10 percent as compared to gas turbine using a standard natural gas which comprises from about 95 to about 99+ volume percent methane. In most cases in this aspect, output may be increased by at least about 20 and up to about 30 percent with these latter limits being imposed by the mechanical design limitations of the gas turbine.

In the aspect of the invention where methane is shifted to hydrogen gas, a portion of the methane from natural gas is catalytically converted or reformed into hydrogen gas which then forms the hydrogen enhanced methane/hydrogen gas blend. The reactions which to obtain this conversion include:

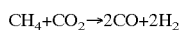
$CH_4+CO_2 \rightarrow 2CO+2H_2$

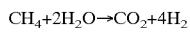
$CH_4+2H_2O \rightarrow CO_2+4H_2$

In an another important aspect, especially where methane is shifted to hydrogen, prior to the conversion reaction, hydrogen sulfide and other acid components such as COS, RSH and RSSR are removed from the natural gas using a physical solvent to provide a sweet natural gas. A physical solvent selectively removes hydrogen sulfide and other acid gases, but minimizes the removal of inert gases, such as nitrogen and carbon dioxide and other inert gases such as helium and aragon. In this aspect, the physical solvent is selected from the group consisting of methanol, a blend of dimethyl ethers of polyethylene glycol (molecular weight about 280), propylene carbonate (b.p.of 240° C., N-methyl-2-pryrrolidone (b.p. 202° C.), a blend of oligoethlene glycol methyl isopropyl ethers (b.p. about 320° C.), tri-n-butyl phosphonate (b.p. 180° C. at 30 mm Hg) and methyl cyano-acetate (b.p. 202° C.). The sweet natural gas is mixed with sufficient water to permit sufficient production of hydrogen from the methane to achieve flame stability or a BTU/Scf value of at least about 110. In this aspect, it is important that the hydrogen sulfide and other acid gases are removed prior to reforming a portion of the methane to hydrogen because the reformation is a catalyzed reaction where the catalyst may be poisoned by the hydrogen sulfide gas and other acid gases. Catalysts which are sensitive to the acid conditions and which may be used in this aspect of the invention include the C11 Series catalyst from United Catalyst Inc., R67 from Haldor Topsoe and G1-25 from BASF. High temperature "shift catalysts" for sweet natural gas generally are made from copper, zinc and aluminum.

In another important aspect, the reformation reaction is done under acid or sour conditions using catalysts such as a C25 Series catalyst from United Catalyst Inc., K8-11 catalyst from BASF and SSK catalyst from Haldor Topsoe. In general these catalysts are chrome/molybdenum catalysts. In this aspect of the invention, the sour natural gas and water are mixed with the water being in amount which will result in a methane gas/water blend which will permit the formation or reformation of sufficient hydrogen gas to provide flame stability for the hydrogen enhanced inert gas/methane gas/hydrogen gas blend which does not have in excess of 40 volume percent methane.

After blending the inert gases with the natural gas reserves, the inert enhanced methane gas blend may have as low as 35, 25 or even less than 20 volume percent methane and still provide more power than pipeline quality methane when using hydrogen to provide flame stability to provide a fuel for gas turbines. In practicing this aspect of the invention, sufficient methane should be converted into hydrogen to produce a hydrogen enhanced hydrogen/inert gas/methane gas blend with at least 6 volume percent, and preferably from about 6 to about 10 volume percent hydrogen. This will produce a hydrogen enhanced hydrogen/inert gas/methane gas blend with stable flammability that is very effective for fueling gas turbines for the generation of electric power.

DETAILED DESCRIPTION OF THE INVENTION

Figure 2A:
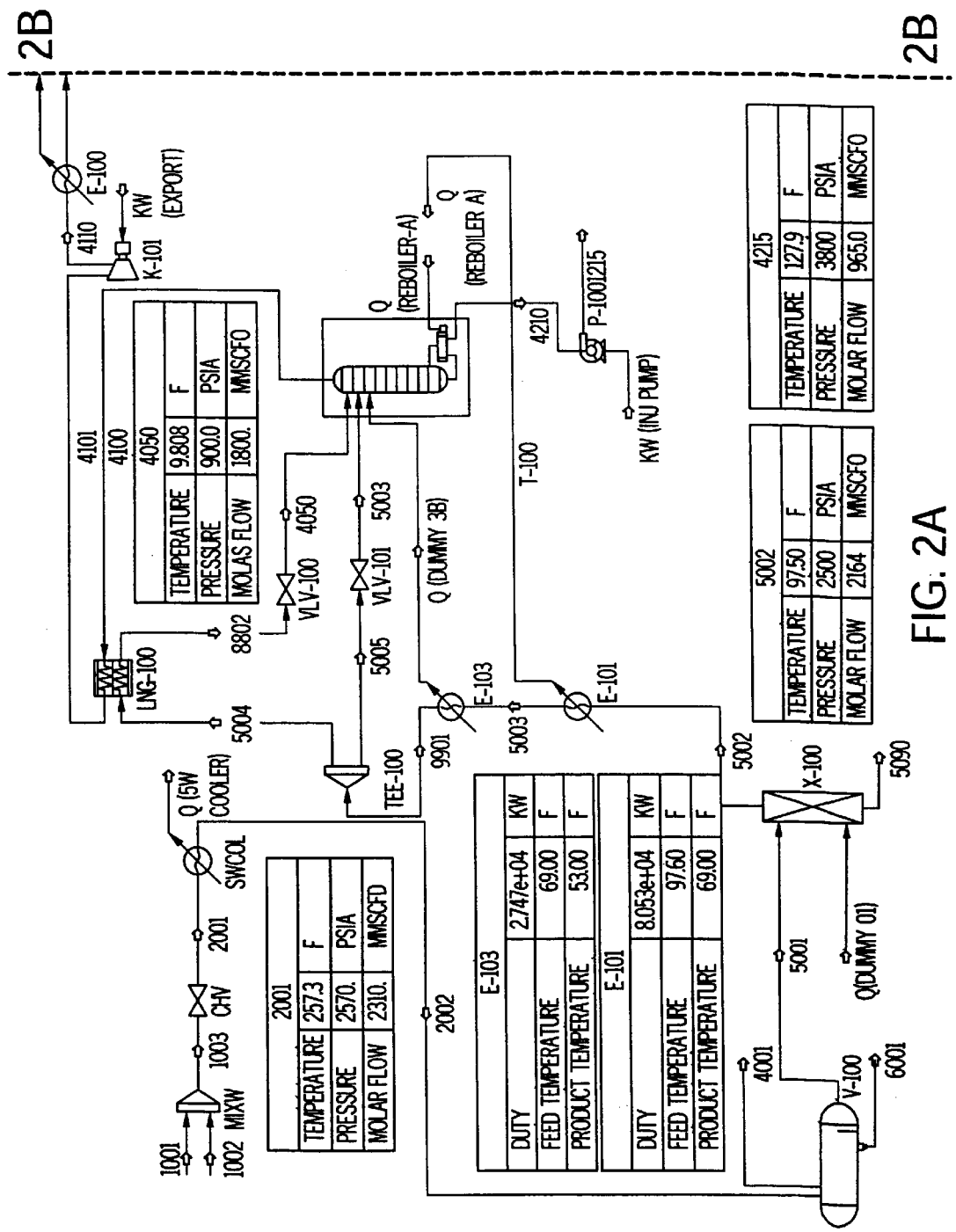
FIGS. 2A and 2B, herein collectively referred to as FIG. 2, depict a flow plan illustrating the process of the invention where high pressure feed natural gas is flashed to a lower pressure to separate methane gas from carbon dioxide gas both of which are present in the high feed natural gas.
Figure 2B:
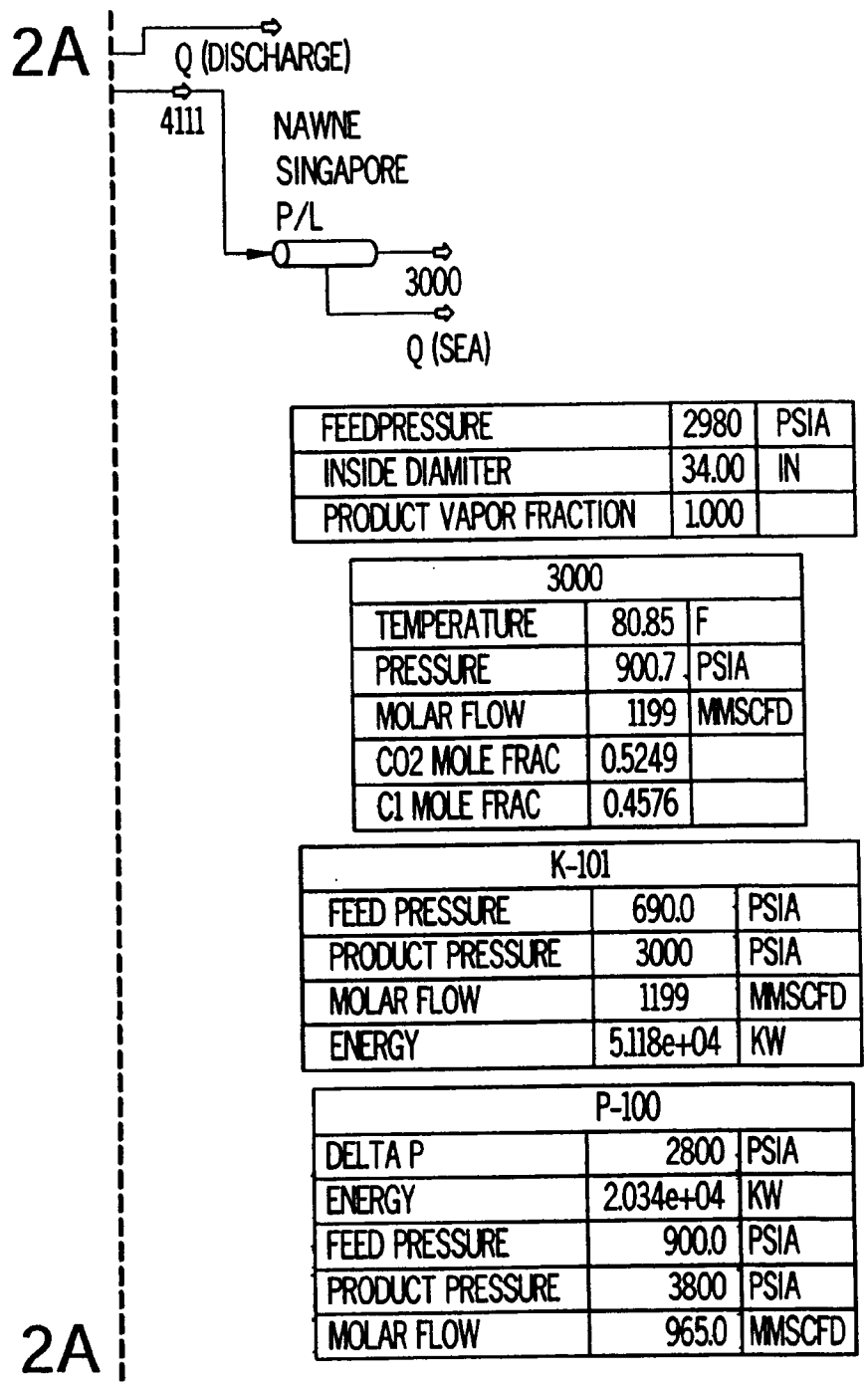
Figure 3:
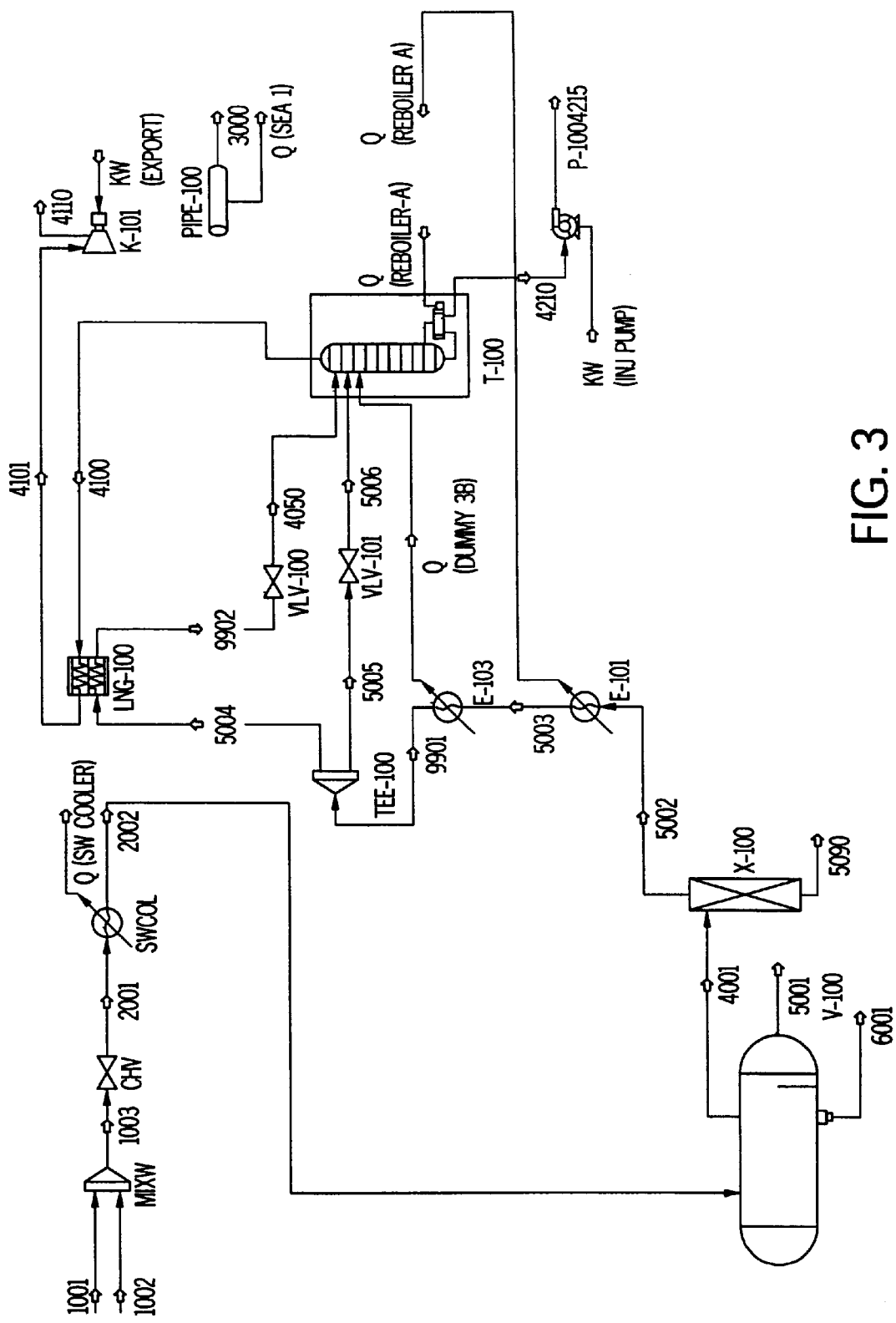
FIG. 3 is a flow plan illustrating the process of the invention where low pressure feed natural gas is refrigerated using an external refrigeration device to separate methane gas from carbon dioxide gas both of which are present in a low pressure feed natural gas.

A natural gas reserve having from about 40 to about 80 volume percent methane and a high relative concentration of inert gas such as nitrogen, carbon dioxide, helium and aragon is conveyed to a separation unit to separate the inert gases from the methane gas in the natural gas reserve. This produces a relatively pure methane stream and an inert gas/methane stream. If the reserve has high nitrogen content, the nitrogen gas can be separated from the methane gas using membranes, such as the Medal membranes. If the inert gas is carbon dioxide, the inert gas may be separated from the methane gas using a cryogenic separation as seen in FIGS. 2 and 3. After the methane gas is separated from the inert gas, the separated relatively pure methane gas may be conveyed to further purification apparatuses as are known to produce pipeline quality natural gas. If after the separation of the inert gas from the methane gas the inert gas/methane stream does not have sufficient inert gas to increase the power output of a gas turbine as described, then further inert gases may be added to the inert gas methane stream to increase the power output by from about 5 to about 20% as compared to a turbine fueled with pipeline quality natural gas. Alternatively, a portion of the natural gas stream which has not been separated from its inert gas components is further blended with inert gases, which have been separated from the reserve gas stream in an amount to provide an inert enhanced natural gas which will increase the output of the turbine by about 5 to about 20% as compared to a turbine fueled with pipeline quality natural gas.

Figure 1:
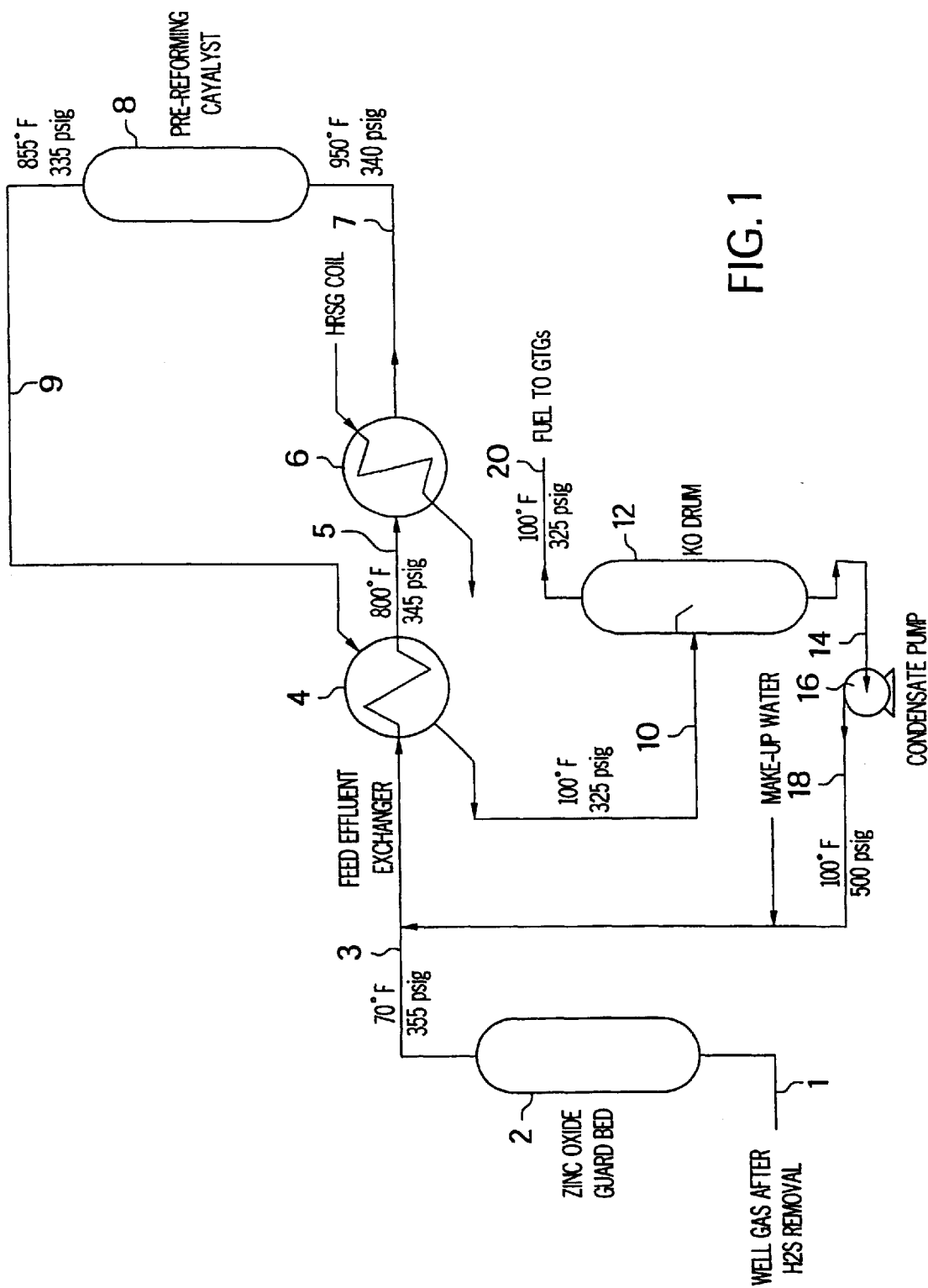
FIG. 1 is a flow plan illustrating the process of the invention where some of the methane is shifted to hydrogen gas to make a hydrogen/inert gas/methane gas blend for fuel for a gas turbine.

In one important aspect, sufficient inert gases may be mixed with the inert gas/methane stream or with the natural gas reserve to lower the methane content of the methane gas in such a blend to less than 40 volume percent. In this aspect as can be seen by reference to FIG. 1 the inert enhanced methane gas blend having a methane concentration of not more than about 40 volume percent is moved treated with a physical solvent such as methanol, a blend of dimethyl ethers of polyethylene glycol, propylene carbonate, N-methyl-2-pryrrolidone, a blend of oligoethlene glycol methyl isopropyl ethers, tri-n-butyl phosphonate, and methyl cyano-acetate to remove hydrogen sulfide gas and other acid gas components without removing inert gases to provide a sweet natural gas with not more than about 40 volume percent methane. Treatment with the physical solvent can be before or after separating the inert gas from the methane gas in the natural gas feed. The sweet inert methane gas blend then is conveyed via line 1 to a zinc oxide guard bed 2 to prevent the emissions of hydrogen sulfide gas. The sweet inert methane gas blend is conveyed from the zinc oxide bed and mixed with water in line 3 to provide an inert enhanced methane gas/water blend. The gas/water blend is conveyed at about 70° F. and at about 355 psig in line 3 to a feed effluent heat exchange 4 where the temperature of the sweet inert enhanced methane gas/water blend is raised to about 800° F. Sufficient water to be mixed with the gas blend to permit sufficient conversion to hydrogen to provide flame stability to a dehydrated hydrogen enhanced inert gas/methane/hydrogen gas blend when it is delivered to the gas turbine generator for the generation of power. After the sweet inert enhanced methane gas blend is mixed with water and heated in the feed effluent exchanger, the heated sweet inert enhanced methane gas/water blend is conveyed via line 5 at about 345 psig and about 800° F. to a heat recovery steam generator coil (HRSG coil) to further raise the temperature of the sweet inert enhanced methane gas/water blend and provide a hot sweet gas/water blend having a temperature of about 950° F. in line 3. The hot sweet gas/water blend then is conveyed via line 7 to a reforming reaction chamber 8 at about 340 psig for converting a part of the methane in the sweet inert enhanced methane gas/water blend to a hydrogen enhanced inert gas/methane/hydrogen gas/water blend. The methane in the sweet gas/water blend undergoes a catalyzed reaction to react the methane and water to produce hydrogen gas at least about 700° F. and preferably from about 900 to about 950° F. and about 340 psig. Higher temperatures facilitate the conversion, while higher pressures adversely affect the conversion. Pressure should not exceed 1500 psig. After conversion of sufficient methane to hydrogen to provide at least about 6 volume percent hydrogen in the gas present after dehydration (hereinafter described), the hydrogen enhanced inert gas/methane/hydrogen gas/water blend is conveyed back to the feed effluent exchanger via line 9 at about 855° F. and 335 psig to transfer heat to the water and methane gas entering the feed effluent exchanger. After the temperature of the hydrogen enhanced inert gas/methane/hydrogen gas/water blend is reduced, it is conveyed via line 10 to a dehydrating knockout drum (KO drum) 12 to reduce the water content of the hydrogen enhanced inert gas/methane/hydrogen gas blend. The dew point is lowered in the KO drum to permit water to condense and separate from the gas. Sufficient water is removed to permit flame stability and provide the gas with at least about 110 BTUs per standard cubic foot of gas. In general, from about 97 to about 99 or more weight percent of the water is removed from the gas. The water resulting from dehydrating the hydrogen enhanced inert gas/methane/hydrogen gas/water blend is removed from the KO drum 12 via line 14 using condensate pump 16 and is conveyed back to the feed effluent exchanger 4 via line 18 at about 100° F. at about 500 psig. The dehydrated hydrogen enhanced inert gas/methane gas/hydrogen gas blend which now has at least 6 volume percent hydrogen or sufficient hydrogen gas to provide flame stability is fed from the KO drum to a gas turbine generator via line 20 at about 100° F. at about psig. There the gas has at least about 110 BTUs per standard cubic foot of gas and provides a stable flame from the gas turbine generator.

The same process may be used in utilizing a sour natural gas using a catalyst which will not be sensitive or poisoned by the acid gases in the natural gas. To keep the process compatible with the environment, however, at least some of the acid gases such as $H_2s$ may be removed at least in part.

The invention is illustrated by the following example.

EXAMPLE I

| GAS TURBINE PERFORMANCE | | | |
|---|---|---|---|
| | Units | No Aug | Power Aug |
| Site Conditions | | | |
| Ambient Temperature | ° F. | 60 | 60 |
| Ambient Pressure | psia | 11.57 | 11.57 |
| Ambient Relative Humidity | % | 60 | 60 |
| Inlet Pressure Drop | In $H_2O$ | 3.0 | 3.0 |
| Performance | | | |
| Gross Generator Output | kW | 156,100 | 157,100 |
| Heat Consumption (LHV) | Btu/h × $10^{-8}$ | 1,477.1 | 1,486.9 |
| Heat Rate (LHV) | Btu/kWh | 9,461 | 9,462 |
| Misc. | | 1.8 | 1.8 |
| LHV | Btu/Lb | 2,424.0 | 2,424.0 |
| | Btu/Scf | 212.5 | 212.5 |
| Fuel Gas Flowrate | lb/s | 169.3 | 170.4 |
| Pressure | psia | 325 | 325 |
| Temperature | ° F. | 80 | 80 |
| Power Aug Inj Conditions | | | |
| Composition | % Vol | | |
| Carbon Dioxide | | 100.0 | 100.0 |
| Flowrate | lb/s | 0.0 | 4.0 |
| Pressure | psia | 285 | 285 |
| Temperature | ° F. | 300 | 300 |
| Exhaust Gas Conditions | | | |
| Exhaust Gas Flow | lb/s | 925.3 | 930.4 |
| Exhaust Gas Temperature | ° F. | 1,093.1 | 1,095.1 |
| Exhaust Gas Composition | % Vol | | |
| Carbon Dioxide | | 13.79 | 14.12 |
| Argon | | 1.07 | 1.07 |
| Nitrogen | | 65.78 | 65.53 |
| Oxygen | | 9.83 | 9.74 |
| Water | | 9.53 | 9.55 |
| Exhaust Pressure Drop | In $H_2O$ | 15.0 | 15.0 |
| Nox (Thermal) | ppmvd @ 15% $O_2$ | <10 | <10 |

Data with respect to FIG. 2 is attached hereto as Appendix for FIG. 2, pages 1–3. Data with respect to FIG. 3 is attached hereto as Appendix for FIG. 3, pages 1–3.

Appendix For FIG. 2 TABLE 1

Reflux 2570 FWHP 1378 Mscfd

|  |  | Composition | | | | Heat Content, BTU/SCF | | | | HHV | OVHD | Prod |
|---|---|---|---|---|---|---|---|---|---|---|---|---|
|  |  | Feed | Sale/Fuel | Fuel | Waste | Feed | Sales | Fuel | Waste | BTU/SCF | Recvy | Recvy |
| Instant | Mscfd | 2500 | 1378.0 | 36.9 | 1122.0 | | | | | | | |
| An. Ave. | Mscfd | 1925.0 | 1061.1 | 28.4 | 863.9 | | | | | | | |
| Instant | GBTU/D | | | | | 734.1 | 656.9 | 17.61 | 66.8 | | | |
| An. Ave. | GBTU/D | | | | | 565.2 | 505.8 | 13.6 | 51.5 | | | |
| % HC Loss | GBTU/D | | | | | | | 2.38% | 9.02% | 11.39% | | |
| N2 | | 0.004108 | 0.007412 | 0.007412 | 0.000050 | 0 | 0 | 0 | 0 | 0.0 | 99% | 1% |
| CO2 | | 0.712909 | 0.523522 | 0.523522 | 0.945507 | 0 | 0 | 0 | 0 | 0.0 | 40% | 60% |
| H2S | | 0.005659 | 0.003471 | 0.003471 | 0.008346 | 0 | 0 | 0 | 0 | 0.0 | 34% | 66% |
| C1 | | 0.268371 | 0.458954 | 0.458954 | 0.034304 | 271 | 464 | 464 | 35 | 1010.0 | 94% | 6% |
| C2 | | 0.005106 | 0.005190 | 0.005190 | 0.005003 | 9 | 9 | 9 | 9 | 1769.6 | 56% | 44% |
| C3 | | 0.001599 | 0.000980 | 0.000980 | 0.002359 | 4 | 2 | 2 | 6 | 2516.1 | 34% | 66% |
| iC4 | | 0.000399 | 0.000164 | 0.000164 | 0.000688 | 1 | 1 | 1 | 2 | 3251.9 | 23% | 77% |
| nC4 | | 0.000398 | 0.000131 | 0.000131 | 0.000726 | 1 | 0 | 0 | 2 | 3262.3 | 18% | 82% |
| iC5 | | 0.000198 | 0.000042 | 0.000042 | 0.00039 | 1 | 0 | 0 | 2 | 4000.9 | 12% | 88% |
| nC5 | | 0.000492 | 0.000087 | 0.000087 | 0.000989 | 2 | 0 | 0 | 4 | 4008.9 | 10% | 90% |
| C6+ | | 0.000756 | 0.000000 | 0.000000 | 0 | 4 | 0 | 0 | 0 | 5502.5 | 0% | 100% |
| H2O | | 0.000005 | 0.000047 | 0.000047 | 0 | 0 | 0 | 0 | 0 | 0.0 | | |
| Totals | | 1.000000 | 1.000000 | 1.000000 | 0.998362 | 294 | 477 | 477 | 60 | | | |

Availability = 77%

| Power, MW | Total | GT1 | GT2 | Elec | LM6000 |
|---|---|---|---|---|---|
| Refrigeration R404a/CO | 0.00 | 0.00 | | | 44,500 HP @ 90F |
| SG1 | 58.85 | | 58.85 | | 33,184 kW @ 90F |
| SG2 | 0.00 | | 0.00 | | 6,644 Heat Rate, BTU/hp |
| CO2 Injection Pump | 23.50 | | | 23.50 | 7,096 GBTU/D @ full power |
| Condy Flash Gas | 0.00 | | 0.00 | | |
| Total MW | 82.35 | 0.00 | 58.85 | 23.50 | |
| No. of LM6000s | 2 | 0 | 1 | 1 | |
| Fuel GBTU/D | 17.61 | — | 12.58 | 5.03 | |

| Total Horsepower | 110,431 | HP |
|---|---|---|
| HC Sales | 624 | Mscfd HC |
|  | 177 | HP/Mscfd |

Appendix For FIG. 2 TABLE 2

2500 psi 1200 M at 45% C1.hsc
Case (Main)
Streams

| Name | | 1001 | 1002 | 1003 | 2001 | 2002 |
|---|---|---|---|---|---|---|
| Vapour Fraction | | 0.0000 | 1.0000 | 1.0000 | 0.9736 | 0.0000 |
| Temperature | (F.) | 712.9 | 300.0* | 300.0* | 257.3 | 80.00* |
| Pressure | (psia) | 5746.* | 5746.* | 5746.* | 2570.* | 2550. |
| Molar Flow | (MMSCFD) | 142.0* | 2168.* | 2310. | 2310. | 2310. |
| Mass Flow | (lb/hr) | 2.809e+05 | 8.681e+06 | 8.982e+06 | 8.962e+06 | 8.962e+06 |
| Liquid Volume Flow | (barrel/day) | 1.927e+04 | 8.751e+05 | 8.944e+05 | 8.944e+05 | 8.944e+05 |
| Heat Flow | (kW) | −4.965e+05 | −9.053e+06 | −9.550e+06 | −9.550e+06 | −9.842e+06 |
| Comp Mole Frac (Nitrogen) | | 0.00008 | 0.0041* | 0.0038 | 0.0038 | 0.0038 |
| Comp Mole Frac (CO2) | | 0.00008 | 0.7121* | 0.6683 | 0.6683 | 0.6683 |
| Comp Mole Frac (H2S) | | 0.0000* | 0.0053* | 0.0050 | 0.0050 | 0.0050 |
| Comp Mole Frac (Methane) | | 0.00008 | 0.2678* | 0.2513 | 0.2513 | 0.2513 |
| Comp Mole Frac (Ethane) | | 0.0000* | 0.0051* | 0.0048 | 0.0048 | 0.0048 |
| Comp Mole Frac (Propane) | | 0.0000* | 0.0016* | 0.0015 | 0.0015 | 0.0015 |
| Comp Mole Frac (H2O) | | 1.0000* | 0.0007* | 0.0622 | 0.0622 | 0.0622 |

| Name | | 3000 | 4001 | 4050 | 4100 | 4101 |
|---|---|---|---|---|---|---|
| Vapour Fraction | | 1.0000 | 1.0000 | 0.3125 | 1.0000 | 1.0000 |
| Temperature | (F.) | 80.85 | 80.00 | 9.808 | 11.65 | 30.27 |
| Pressure | (psia) | 900.7 | 2550. | 900.0* | 900.0 | 890.00 |
| Molar Flow | (MMSCFD) | 1199. | 0.0000 | 1800. | 1199. | 1199. |

-continued

Appendix For FIG. 2 TABLE 2

2500 psi 1200 M at 45% C1.hsc
Case (Main)
Streams

|  |  |  |  |  |  |  |
|---|---|---|---|---|---|---|
| Mass Flow | (lb/hr) | 4.080e+06 | 0.0000 | 7.210e+06 | 4.060e+06 | 4.080e+06 |
| Liquid Volume Flow | (barrel/day) | 4.822e+05 | 0.0000 | 7.271e+05 | 4.822e+05 | 4.822e+05 |
| Heat Flow | (kW) | −4.039e+06 | 0.0000 | −7.759e+06 | −4.080e+06 | −4.066e+06 |
| Comp Mole Frac (Nitrogen) |  | 0.0074 | 0.0041 | 0.0041 | 0.0074 | 0.0074 |
| Comp Mole Frac (CO2) |  | 0.5249 | 0.7083 | 0.7123 | 0.5249 | 0.5249 |
| Comp Mole Frac (H2S) |  | 0.0035 | 0.0053 | 0.0053 | 0.0035 | 0.0035 |
| Comp Mole Frac (Methane) |  | 0.4576 | 0.2668 | 0.2683 | 0.4576 | 0.4576 |
| Comp Mole Frac (Ethane) |  | 0.0052 | 0.0051 | 0.0051 | 0.0052 | 0.0052 |
| Comp Mole Frac (Propane) |  | 0.0010 | 0.0016 | 0.0016 | 0.0010 | 0.0010 |
| Comp Mole Frac (H2O) |  | 0.0000 | 0.0056 | 0.0000 | 0.0000 | 0.0000 |

| Name |  | 4110 | 4111 | 4210 | 4215 | 5001 |
|---|---|---|---|---|---|---|
| Vapour Fraction |  | 1.0000 | 1.0000 | 0.0000 | 0.0000 | 0.0000 |
| Temperature | (F.) | 219.6 | 120.0* | 65.00 | 127.9 | 80.00 |
| Pressure | (psia) | 3000.* | 2980. | 900.0 | 3800.* | 2550. |
| Molar Flow | (MMSCFD) | 1199. | 1199. | 965.0 | 965.0 | 2176. |
| Mass Flow | (lb/hr) | 4.080e+06 | 4.080e+06 | 4.585e+06 | 4.585e+06 | 8.689e+06 |
| Liquid volume Flow | (barrel/day) | 4.822e+05 | 4.822e+05 | 3.917e+05 | 3.917e+05 | 8.755e+05 |
| Heat Flow | (kW) | −4.015e+06 | −4.077e+06 | −5.165e+06 | −5.145e+06 | −9.310e+06 |
| Comp Mole Frac (Nitrogen) |  | 0.0074 | 0.0074 | 0.0000 | 0.0000 | 0.0041 |
| Comp Mole Frac (CO2) |  | 0.5249 | 0.5249 | 0.9451 | 0.9451 | 0.7083 |
| Comp Mole Frac (H2S) |  | 0.0035 | 0.0035 | 0.0075 | 0.0075 | 0.0053 |
| Comp Mole Frac (Methane) |  | 0.4576 | 0.4576 | 0.0332 | 0.0332 | 0.2668 |
| Comp Mole Frac (Ethane) |  | 0.0052 | 0.0052 | 0.0050 | 0.0050 | 0.0051 |
| Comp Mole Frac (Propane) |  | 0.0010 | 0.0010 | 0.0024 | 0.0024 | 0.0016 |
| Comp Mole Frac (H2O) |  | 0.0000 | 0.0000 | 0.0000 | 0.0000 | 0.0056 |

Appendix For FIG. 2. TABLE 3

2500 psi 1200 M at 45% C1.hsc
Case (Main)
Streams

| Name |  | 5002 | 5003 | 5004 | 5005 | 5006 |
|---|---|---|---|---|---|---|
| Vapour Friction |  | 1.0000 | 0.0000 | 0.0000 | 0.0000 | 0.3721 |
| Temperature | (F.) | 97.50 | 69.00* | 53.00 | 53.00 | 14.30 |
| Pressure | (psia) | 2500.* | 2490. | 2480. | 2480. | 900.0* |
| Molar Flow | (MMSCFD) | 2164. | 2164. | 1800. | 363.5 | 363.5 |
| Mass Flow | (lb/hr) | 8.665e+06 | 8.665e+06 | 7.210e+06 | 1.456e+06 | 1.456e+06 |
| Liquid Volume Flow | (barrel/day) | 8.739e+05 | 8.739e+05 | 7.271e+05 | 1.468e+05 | 1.468e+05 |
| Heat Flow | (kW) | −9.231e+06 | −9.281e+06 | −7.745e+06 | −1.564e+06 | −1.564e+06 |
| Comp Mole Frac (Nitrogen) |  | 0.0041 | 0.0041 | 0.0041 | 0.0041 | 0.0041 |
| Comp Mole Frac (CO2) |  | 0.7123 | 0.7123 | 0.7123 | 0.7123 | 0.7123 |
| Comp Mole Frac (H2S) |  | 0.0053 | 0.0053 | 0.0053 | 0.0053 | 0.0053 |
| Comp Mole Frac (Methane) |  | 0.2683 | 0.2683 | 0.2683 | 0.2683 | 0.2683 |
| Comp Mole Frac (Ethane) |  | 0.0051 | 0.0051 | 0.0051 | 0.0051 | 0.0051 |
| Comp Mole Frac (Propane) |  | 0.0016 | 0.0016 | 0.0016 | 0.0016 | 0.0016 |
| Comp Mole Frac (H2O) |  | 0.0000 | 0.0000 | 0.0000 | 0.0000 | 0.0000 |

| Name |  | 5090 | 6001 | 9901 | 9902 | kW (Export) |
|---|---|---|---|---|---|---|
| Vapour Fraction |  | — | 0.0000 | 0.0000 | 0.0000 | — |
| Temperature | (F.) | — | 80.00 | 53.00* | 43.00* | — |
| Pressure | (psia) | 15.00* | 2550. | 2480. | 2470. | — |
| Molar Flow | (MMSCFD) | 12.10 | 134.1 | 2164. | 1800. | — |
| Mass Flow | (lb/hr) | 2.394e+04 | 2.726e+05 | 8.665e+06 | 7.210e+06 | — |
| Liquid Volume Flow | (barrel/day) | 1642. | 1.888e+04 | 8.739e+05 | 7.271e+05 | — |
| Heat Flow | (kW) | — | −5.325e+05 | −9.309e+06 | −7.759e+06 | 5.119e+04 |
| Comp Mole Frac (Nitrogen) |  | 0.0000 | 0.0000 | 0.0041 | 0.0041 | — |
| Comp Mole Frac (CO2) |  | 0.0000 | 0.0190 | 0.7123 | 0.7123 | — |
| Comp Mole Frac (H2S) |  | 0.0000 | 0.0003 | 0.0053 | 0.0053 | — |
| Comp Mole Frac (Methane) |  | 0.0000 | 0.0000 | 0.2683 | 0.2683 | — |
| Comp Mole Frac (Ethane) |  | 0.0000 | 0.0000 | 0.0051 | 0.0051 | — |
| Comp Mole Frac (Propane) |  | 0.0000 | 0.0000 | 0.0016 | 0.0016 | — |
| Comp Mole Frac (H2O) |  | 1.0000 | 0.9807 | 0.0000 | 0.0000 | — |

-continued

Appendix For FIG. 2. TABLE 3

2500 psi 1200 M at 45% C1.hsc
Case (Main)
Streams

| Name | | kW (Inj Pump) | Q(Discharge) | Q(dummy 3B) | Q(dummy-01) | Q(Reboiler A) |
|---|---|---|---|---|---|---|
| Vapour Fraction | | — | — | — | — | — |
| Temperature | (F.) | — | — | — | — | — |
| Pressure | (psia) | — | — | — | — | — |
| Molar Flow | (MMSCFD) | — | — | — | — | — |
| Mass Flow | (lb/hr) | — | — | — | — | — |
| Liquid Volume Flow | (barrel/day) | — | — | — | — | — |
| Heat Flow | (kW) | 2.034e+04 | 6.221e+04 | 2.747e+04 | — | 5.053e+04 |
| Comp Mole Frac (Nitrogen) | | — | — | — | — | — |
| Comp Mole Frac (CO2) | | — | — | — | — | — |
| Comp Mole Frac (H2S) | | — | — | — | — | — |
| Comp Mole Frac (Methane) | | — | — | — | — | — |
| Comp Mole Frac (Ethane) | | — | — | — | — | — |
| Comp Mole Frac (Propane) | | — | — | — | — | — |
| Comp Mole Frac (H2O) | | — | — | — | — | — |

Appendix For FIG. 3 TABLE 1

Reflux 850 PSIA @ 2070 FWHP

| | | Composition | | | | Heat Content, BTU/SCF | | | | HHV | OVHD | Prod |
|---|---|---|---|---|---|---|---|---|---|---|---|---|
| | | Feed | Sale/Fuel | Fuel | Waste | Feed | Sales | Fuel | Waste | BTU/SCF | Recvy | Recvy |
| Instant | Mscfd | 1081 | 614.8 | 17.1 | 466.2 | | | | | | | |
| An. Ave. | Mscfd | 1027.0 | 584.1 | 16.3 | 442.9 | | | | | | | |
| Instant | GBTU/D | | | | | 317.4 | 285.9 | 7.97 | 27.0 | | | |
| An. Ave. | GBTU/D | | | | | 301.5 | 271.6 | 7.8 | 25.7 | | | |
| % HC Loss | GBTU/D | | | | | | | 2.48% | 8.42% | 10.90% | | |
| N2 | | 0.004108 | 0.007207 | 0.007207 | 0.000021 | 0 | 0 | 0 | 0 | 0.0 | 100% | 0% |
| CO2 | | 0.712909 | 0.535264 | 0.535264 | 0.947178 | 0 | 0 | 0 | 0 | 0.0 | 43% | 57% |
| H2S | | 0.005659 | 0.003558 | 0.003558 | 0.008430 | 0 | 0 | 0 | 0 | 0.0 | 36% | 64% |
| C1 | | 0.268371 | 0.447200 | 0.447200 | 0.032541 | 271 | 452 | 452 | 33 | 1010.0 | 95% | 5% |
| C2 | | 0.005106 | 0.005267 | 0.005267 | 0.004894 | 9 | 9 | 9 | 9 | 1769.6 | 59% | 41% |
| C3 | | 0.001599 | 0.001010 | 0.001010 | 0.002376 | 4 | 3 | 3 | 6 | 2516.1 | 36% | 64% |
| iC4 | | 0.000399 | 0.000168 | 0.000168 | 0.000704 | 1 | 1 | 1 | 2 | 3251.9 | 24% | 76% |
| nC4 | | 0.000398 | 0.000134 | 0.000134 | 0.000746 | 1 | 0 | 0 | 2 | 3262.3 | 19% | 81% |
| iC5 | | 0.000198 | 0.000043 | 0.000043 | 0.000402 | 1 | 0 | 0 | 2 | 4000.9 | 12% | 88% |
| nC5 | | 0.000492 | 0.000087 | 0.000087 | 0.001026 | 2 | 0 | 0 | 4 | 4008.9 | 10% | 90% |
| C6+ | | 0.000756 | 0.000000 | 0.000000 | 0 | 4 | 0 | 0 | 0 | 5502.5 | 0% | 100% |
| H2O | | 0.000005 | 0.000062 | 0.000062 | 0 | 0 | 0 | 0 | 0 | 0.0 | | |
| Totals | | 1.000000 | 1.000000 | 1.000000 | 0.998317 | 294 | 465 | 465 | 58 | | | |
| Availability = 95% | | | | | | | | | | | | |

| Power, MW | Total | GT1 | GT2 | Elec | LM6000 |
|---|---|---|---|---|---|
| Refrigeration R404a/CO | 0.00 | 0.00 | | | 44,500 HP @ 90F |
| SG1 | 27.56 | | 27.56 | | 33,184 kW @ 90F |
| SG2 | 0.00 | | 0.00 | | 6,644 Heat Rate, BTU/hp |
| CO2 Injection Pump | 9.69 | | | 9.69 | 7,096 GBTU/D @ full power |
| Condy Flash Gas | 0.00 | | 0.00 | | |
| Total MW | 37.25 | 0.00 | 27.56 | 9.69 | |
| No. of LM6000s | 2 | 0 | 1 | 1 | |
| Fuel GBTU/D | 7.97 | — | 5.89 | 2.07 | |

Appendix For FIG. 3 TABLE 2

Dehy & Reflux Column 2070 FWHP.hsc
Main: Streams
Streams

| Name | | 1001 | 1002 | 1003 | 2001 | 2002 |
|---|---|---|---|---|---|---|
| Vapour Fraction | | 0.0000 | 1.0000 | 1.0000 | 0.9681 | 0.9408 |
| Temperature | (F.) | 712.9 | 300.0* | 300.0* | 244.0 | 80.00* |
| Pressure | (psia) | 5746.* | 5746.* | 5746. | 2070.* | 2050. |
| Molar Flow | (MMSCFD) | 71.00* | 1084.* | 1155. | 1155. | 1155. |
| Mass Flow | (lb/hr) | 1.404e+05 | 4.340e+06 | 4.481e+06 | 4.481e+06 | 4.481e+06 |
| Liquid Volume Flow | (barrel/day) | 9636. | 4.376e+05 | 4.472e+05 | 4.472e+05 | 4.472e+05 |
| Heat Flow | (kW) | −2.483e+05 | −4.527e+06 | −4.775e+06 | −4.775e+06 | −4.911e+06 |
| Comp Mole Frac (Nitrogen) | | 0.0000* | 0.0041* | 0.0038 | 0.0038 | 0.0038 |
| Comp Mole Frac (CO2) | | 0.0000* | 0.7121* | 0.6683 | 0.6683 | 0.6683 |
| Comp Mole Frac (H2S) | | 0.0000* | 0.0053* | 0.0050 | 0.0050 | 0.0050 |
| Comp Mole Frac (Methane) | | 0.0000* | 0.2678* | 0.2513 | 0.2513 | 0.2513 |
| Comp Mole Frac (Ethane) | | 0.0000* | 0.0051* | 0.0048 | 0.0048 | 0.0048 |
| Comp Mole Frac (Propane) | | 0.0000* | 0.0016* | 0.0015 | 0.0015 | 0.0015 |
| Comp Mole Frac (H2O) | | 1.0000* | 0.0007* | 0.0622 | 0.0622 | 0.0622 |
| Name | | 3000 | 4001 | 4050 | 4100 | 4101 |
| Vapour Fraction | | — | 1.0000 | 0.3738 | 1.0000 | 1.0000 |
| Temperature | (F.) | — | 80.00 | 9.978 | 10.99 | 26.03 |
| Pressure | (psia) | — | 2050. | 850.0* | 850.0 | 840.00 |
| Molar Flow | (MMSCFD) | — | 1087. | 900.0 | 614.7 | 614.7 |
| Mass Flow | (lb/hr) | — | 4.342e+06 | 3.604e+06 | 2.112e+08 | 2.112e+06 |
| Liquid Volume Flow | (barrel/day) | — | 4.376e+05 | 3.635e+05 | 2.472e+05 | 2.472e+05 |
| Heat Flow | (kW) | — | −4.639e+06 | −3.874e+06 | −2.118e+06 | −2.113e+06 |
| Comp Mole Frac (Nitrogen) | | — | 0.0041 | 0.0041 | 0.0072 | 0.0072 |
| Comp Mole Frac (CO2) | | — | 0.7092 | 0.7123 | 0.5352 | 0.5352 |
| Comp Mole Frac (H2S) | | — | 0.0053 | 0.0053 | 0.0036 | 0.0036 |
| Comp Mole Frac (Methane) | | — | 0.2672 | 0.2683 | 0.4473 | 0.4473 |
| Comp Mole Frac (Ethane) | | — | 0.0051 | 0.0051 | 0.0053 | 0.0053 |
| Comp Mole Frac (Propane) | | — | 0.0016 | 0.0016 | 0.0010 | 0.0010 |
| Comp Mole Frac (H2O) | | — | 0.0043 | 0.0000 | 0.0000 | 0.0000 |
| Name | | 4110 | 4210 | 4215 | 5001 | 5002 |
| Vapour Fraction | | 1.0000 | 0.0000 | 0.0000 | 0.0000 | 1.0000 |
| Temperature | (F.) | 225.2 | 60.01 | 118.6 | 80.00 | 82.33 |
| Pressure | (psia) | 3000.* | 850.0 | 3800.* | 2050. | 2000.* |
| Molar Flow | (MMSCFD) | 614.7 | 467.2 | 467.2 | 0.0000 | 1082. |
| Mass Flow | (lb/hr) | 2.112e+06 | 2.221e+06 | 2.221e+06 | 0.0000 | 4.333e+06 |
| Liquid Volume Flow | (barrel/day) | 2.472e+05 | 1.897e+05 | 1.897e+05 | 0.0000 | 4.369e+05 |
| Heat Flow | (kW) | −2.085e+06 | −2.504e+06 | −2.495e+06 | 0.0000 | −4.617e+06 |
| Comp Mole Frac (Nitrogen) | | 0.0072 | 0.0000 | 0.0000 | 0.0041* | 0.0041 |
| Comp Mole Frac (CO2) | | 0.5352 | 0.9453 | 0.9453 | 0.7092* | 0.7123 |
| Comp Mole Frac (H2S) | | 0.0036 | 0.0076 | 0.0076 | 0.0053* | 0.0053 |
| Comp Mole Frac (Methane) | | 0.4473 | 0.0328 | 0.0328 | 0.2672* | 0.2683 |
| Comp Mole Frac (Ethane) | | 0.0053 | 0.0049 | 0.0049 | 0.0051* | 0.0051 |
| Comp Mole Frac (Propane) | | 0.0010 | 0.0024 | 0.0024 | 0.0016* | 0.0016 |
| Comp Mole Frac (H2O) | | 0.0000 | 0.0000 | 0.0000 | 0.0043* | 0.0000 |

Appendix For FIG. 3 TABLE 3

Dehy & Reflux Column 2070 FWHP.hsc
Main: Streams
Streams

| Name | | 5003 | 5004 | 5005 | 5006 | 5090 |
|---|---|---|---|---|---|---|
| Vapour Fraction | | 1.0000 | 0.0000 | 0.0000 | 0.4201 | — |
| Temperature | (F.) | 62.00* | 50.00 | 50.00 | 13.33 | — |
| Pressure | (psia) | 1990. | 1980. | 1980. | 850.0* | 15.00* |
| Molar Flow | (MMSCFD) | 1082. | 900.0* | 181.9 | 181.9 | 4.671 |
| Mass Flow | (lb/hr) | 4.333e+06 | 3.604e+06 | 7.285e+05 | 7.285e+05 | 9239. |
| Liquid Folume Flow | (barrell/day) | 4.369e+05 | 3.635e+05 | 7.348e+04 | 7.346e+04 | 633.9 |
| Heat Flow | (kW) | −4.639e+06 | −3.869e+06 | −7.819e+05 | −7.819e+05 | −2.193e+04 |
| Comp Mole Frac (Nitrogen) | | 0.0041 | 0.0041 | 0.0041 | 0.0041 | 0.0000 |
| Comp Mole Frac (CO2) | | 0.7123 | 0.7123 | 0.7123 | 0.7123 | 0.0000 |

-continued

Appendix For FIG. 3 TABLE 3

Dehy & Reflux Column 2070 FWHP.hsc
Main: Streams
Streams

| | | | | | | |
|---|---|---|---|---|---|---|
| Comp Mole Frac (H2S) | | 0.0053 | 0.0053 | 0.0053 | 0.0053 | 0.0000 |
| Comp Mole Frac (Methane) | | 0.2683 | 0.2883 | 0.2683 | 0.2683 | 0.0000 |
| Comp Mole Frac (Ethane) | | 0.0051 | 0.0051 | 0.0051 | 0.0051 | 0.0000 |
| Comp Mole Frac (Propane) | | 0.0016 | 0.0016 | 0.0016 | 0.0016 | 0.0000 |
| Comp Mole Frac (H2O) | | 0.0000 | 0.0000 | 0.0000 | 0.0000 | 1.0000 |

| Name | | 6001 | 9901 | 9902 | Kw(Export) | kW (Inj Pump) |
|---|---|---|---|---|---|---|
| Vapour Fraction | | 0.0000 | 0.0000 | 0.0000 | — | — |
| Temperature | (F.) | 80.00 | 50.00* | 43.00* | — | — |
| Pressure | (psia) | 2050. | 1980. | 1970. | — | — |
| Molar Flow | (MMSCFD) | 68.43 | 1082. | 900.0 | — | — |
| Mass Flow | (lb/hr) | 1.390e+05 | 4.333e+06 | 3.604e+06 | — | — |
| Liquid Folume Flow | (barrell/day) | 9630 | 4.369e+05 | 3.835e+05 | — | — |
| Heat Flow | (kW) | −2.718e+05 | −4.651e+06 | −3.874e+06 | 2.756e+04 | 9694. |
| Comp Mole Frac (Nitrogen) | | 0.0000 | 0.0041 | 0.0041 | — | — |
| Comp Mole Frac (CO2) | | 0.0187 | 0.7123 | 0.7123 | — | — |
| Comp Mole Frac (H2S) | | 0.0003 | 0.0053 | 0.0053 | — | — |
| Comp Mole Frac (Methane) | | 0.0000 | 0.2683 | 0.2683 | — | — |
| Comp Mole Frac (Ethane) | | 0.0000 | 0.0051 | 0.0051 | — | — |
| Comp Mole Frac (Propane) | | 0.0000 | 0.0016 | 0.0016 | — | — |
| Comp Mole Frac (H2O) | | 0.9810 | 0.0000 | 0.0000 | — | — |

| Name | | Q(dummy 3B) | Q(Reboiler A) | Q(Reboiler-A) | Q(Sea 1) | Q(SW Cooler) |
|---|---|---|---|---|---|---|
| Vapour Fraction | | — | — | — | — | — |
| Temperature | (F.) | — | — | — | — | — |
| Pressure | (psia) | — | — | — | — | — |
| Molar Flow | (MMSCFD) | — | — | — | — | — |
| Mass Flow | (lb/hr) | — | — | — | — | — |
| Liquid Folume Flow | (barrell/day) | — | — | — | — | — |
| Heat Flow | (kW) | 1.206e+04 | 2.142e+04 | 2.141e+04 | — | 1.360e+05 |
| Comp Mole Frac (Nitrogen) | | — | — | — | — | — |
| Comp Mole Frac (CO2) | | — | — | — | — | — |
| Comp Mole Frac (H2S) | | — | — | — | — | — |
| Comp Mole Frac (Methane) | | — | — | — | — | — |
| Comp Mole Frac (Ethane) | | — | — | — | — | — |
| Comp Mole Frac (Propane) | | — | — | — | — | — |
| Comp Mole Frac (H2O) | | — | — | — | — | — |

What is claimed is:

1. A method of fueling a gas turbine with methane gas from natural gas reserves having from about 40 to about 80 volume percent methane, the method comprising:

providing a first natural gas stream from the natural gas reserve;

separating inert gases from methane gas in the first natural gas stream to provide a separated methane gas and a separated inert gas;

blending the separated inert gas with a second natural gas stream having from about 40 to about 80 volume percent methane; and using the blended stream of separated inert gas with said second natural gas stream to fuel said gas turbine wherein after blending the amount of inert gas in the blended stream is sufficient to increase the output of a gas turbine by at least about 5 percent as compared to a turbine fueled with pipeline quality natural gas.

2. A method as recited in claim 1 wherein the inert gases include nitrogen gas and the nitrogen gas is separated from the methane gas in the first natural gas stream with a membrane.

3. A method as recited in claim 1 wherein the inert gases include carbon dioxide gas and the carbon dioxide gas is cryogenically separated from the methane gas in the first natural gas steam.

4. A method as recited in claim 3 wherein the cryogenic separation is done with a natural gas reserve with a high pressure feed having a pressure greater than about 2500 psig and the high pressure feed is expanded to a lower pressure which is effective to separate the carbon dioxide gas and the methane gas in the first natural gas stream.

5. A method as recited in claim 3 wherein the cryogenic separation is done with a natural gas reserve with a low pressure feed having a pressure lower than about 1100 psig and the low pressure feed is cooled with a refrigeration unit to a temperature which is effective to separate the carbon dioxide gas and the methane gas in the first natural gas stream.

6. A method as recited in claim 1, 2, 3, 4, or 5 wherein the separated methane gas from the first natural gas strewn is processed into pipeline quality natural gas.

* * * * *